United States Patent [19]

Gorgerino

[11] Patent Number: 4,589,915

[45] Date of Patent: May 20, 1986

[54] ADDITIVE FOR METALLURGIC LIQUIDS BEING EFFECTIVE TO IMPROVE THE CHARACTERISTICS OF METAL OR METAL ALLOY ARTICLES OF MANUFACTURE

[75] Inventor: Mario D. Gorgerino, Milan, Italy

[73] Assignee: O.E.T. Metalconsult s.r.l., Milan, Italy

[21] Appl. No.: 703,164

[22] Filed: Feb. 19, 1985

[30] Foreign Application Priority Data

Feb. 28, 1984 [IT] Italy ................... 19828 A/84

[51] Int. Cl.$^4$ ............................................. C21C 7/02
[52] U.S. Cl. ...................................... 75/53; 75/58
[58] Field of Search ................................ 75/53, 58

[56] References Cited

U.S. PATENT DOCUMENTS 3,847,592 11/1974 Schokkenbrock ................. 75/58

*Primary Examiner*—Peter D. Rosenberg
*Attorney, Agent, or Firm*—Guido Modiano; Albert Josif

[57] ABSTRACT

An additive for metallurgic liquids is disclosed which is effective to efficiently remove slag therefrom and comprises at least one colloidal substance mainly consisting of colloidal silica. The additive may include such minerals as opal, kieselgur, tripoli, obsidians, pumices, zeolites, vermiculite or bentonites, either singly or mixed together.

15 Claims, No Drawings

ADDITIVE FOR METALLURGIC LIQUIDS BEING EFFECTIVE TO IMPROVE THE CHARACTERISTICS OF METAL OR METAL ALLOY ARTICLES OF MANUFACTURE

BACKGROUND OF THE INVENTION

This invention relates to additives for metallurgic liquids, which are effective to improve the structural and mechanical characteristics of metal or metal alloy articles of manufacture. In particular, this invention is concerned with additives effective to pick up and remove slag and degassing reaction products having non-metallic character from metallurgic liquids.

It is known that a problem of metallurgic processes is that of removing the non-metallic particles which are to be found or form in the course of metal melting and re-melting, which particles, if retained as inclusions in metal articles produced thereby would break the regularity of the crystal lattice of the metallic bond, and constitute a weak point which degrades the mechanical characteristics of the final product.

The means and systems currently employed to obviate the problem of removal of such particles or generic slag vary with the types of metallurgy, and have degrees of effectiveness ranging from none to limited, providing somewhat erratic results.

Thus, as an example, in reduction metallurgy, liquid slag flows out of the furnace, or blast furnace, together with the metals and metal alloys obtained by reduction of their minerals. The lower or higher density of slag relatively to the metals and alloys is the only natural way of causing some, never all, of the slag to float on or decant from the metal mass. In the remelting metallurgy, such as is typical with steelworks, that process is carried out under an artificially formed liquid slag which is only partly removed by draining it from the furnace crucible into suitable tanks. Thus, solidified steel will contain in the form of inclusions, in addition to endogenous inclusions, also residues of the slag retained in the liquid bath.

In the steel refining process, even where argon gas jets are used to encourage floating up the exogenous and endogenous inclusions, the results are only moderately satisfactory and quite erratic.

In the manufacture of cupola furnace cast iron, or induction furnace cast iron, only the slag having a high-melting point and clotted slag will surface in the ladle on casting and can be readily removed. Slag having a low-melting point, which remains liquid, such as the compounds of fayalite, wustite, tridymite+fayalite or fayalite+wustite whose formation is a recurring phenomenon in cast iron melting, are left homogeneously admixed to metal in casting. Solid state cast iron may, therefore, periodically exhibit in its structure cast fragments of the macroinclusions which can be detected at the optical microscope in the form of dark spots of an irregular geometric appearance.

Where the presence of liquid slag is instead conspicuous, the latter will, on account of its density, during the solidification stage of cast iron, interpose itself at the upper regions between the agglutinant and solid metal of the cast piece. Thus, the latter is bound to undergo outer structural deformations resulting in a reject.

In remelting non-ferrous metals and alloys, removal of the bound slag having a high-melting point is effected by skimming the liquid surface in the ladle, but similarly to cast iron, liquid slag having a low-melting point cannot be removed. In particular with aluminum and its alloys, inclusions of alumina are recurrent, more likely aluminum hydroxides, which although forming slag having a high-melting point, fail to surface and result in highly objectionable inclusions if incorporated to the solid formed. This phenomenon already appears in processing aluminum metal and requires, for a partial removal thereof, expensive filtering processes. With copper and its alloys, the low-melting liquid slag comprises non-stoichiometric compounds wherein sulphides, phosphides, etc. prevail.

Besides the foregoing, which adopts a continuous character which may be visually apparent, intermittent phenomena also occasionally occur in the manufactures of all ferrous and non-ferrous alloys, such as an increase, without any apparent reasons or chemical changes, in the viscosity of the molten alloy baths, which affects castability. This phenomenon is to be attributed to the formation of colloidal phases within the liquid alloy, which phases are sometimes inherent to addition alloys. Such colloids are formed by combining elements having a high electronegativity, with elements having a high electropositivity in a non-stoichiometric form, and occasionally assume, during solidification of the alloys, layered films which, in some cases intervene between the crystal lattices of the metallic bond, and in other cases assume the form of long filaments which extend along the edges of the grains, and have shown to be the cause or joint cause of the fractures detected in articles formed from such alloys.

SUMMARY OF THE INVENTION

It is a primary object of this invention to provide an additive for metallurgic liquids which can obviate such prior drawbacks affecting the removal of slag and degassing reaction products of a non-metallic nature from metallurgic liquids.

In particular, it is an object of this invention to provide an additive which can result in a substantial and effective removal of such slag and, accordingly, afford articles of manufacture having good mechanical characteristics.

It is a further object of this invention to provide an additive for metallurgic liquids which can afford an improved solidified structure of the metallurgic liquid, and thus improve the mechanical characteristics of the resulting articles.

Another object of this invention is to provide an additive for metallurgic liquids which is effective to improve the working conditions during the metallurgic process, on account of its excellent characteristics of thermal insulation and barrier to the external gases overlying the metallurgic liquid being processed.

A not unimportant object of this invention is to provide an additive for metallurgic liquids which can accelerate the diffusion of metals or alloys admitted into a metallurgic liquid solvent, and in the event of metal-to-metalloid reactions, afford a higher number of interactions to thereby perform the function of catalysts.

Still a further object of this invention is to provide a metallurgic process using said additive which results in solidified articles of improved mechanical characteristics.

These and other objects, such as will be apparent hereinafter are achieved by an additive for metallurgic liquids, according to this invention, which is effective to improve the characteristics of the metal or metal alloy articles produced, and characterized in that it comprises at least one colloidal substance including 20% to 99.9% by weight colloidal silica in the form of siloxane three-dimensional lattice comprising 1% to 99.9% dispersed particles by the total weight of said substance.

Viable colloidal substances according to this invention are naturally available minerals, in particular hydrothermal minerals, rocks formed by complex mixed solutions, and organic products, wherein the structures of the composed substances are colloidal. By way of non-limitative example, minerals may be mentioned such as those belonging to the opal group, whereto belong, inter alia, the hydrogel or gel or silica, kieselgur and tripoli comprising the skeletons of radiolarians and diatom shells, obsidians, pumices, zeolites, vermiculites, from minerals of jefferisite, culsageeite, kerrite, maconite, dudleyite, perlite from vitreous volcanic rocks; and bentonites of the clay group such as montmorillonite. Such minerals may be used either singly or as mixtures, or may be further additivated with additional minerals comprising colloidal hydrosilicates of alumina or silica, such as hydrargillite, diaspore, allogonite, and lincolnite. For use in this invention, it is important that the mineral or mixture of minerals employed have the indicated content of colloidal silica in the form of siloxane three-dimensional lattice, and preferably a content of colloidal silica in the 34% to 80% range by the total weight of the additive, and even better in the 70% to 80% range by weight of $SiO_2$. Furthermore, the colloidal silica employed should have a dispersed particle content through the dispersion medium formed by the structure water in the 1% to 99.9% range, preferably in the 30% to 90% range by weight of the colloidal substance weight.

In order to achieve the desirable contents of colloidal silica and dispersed particles, the minerals, additionally to being employed mixed together, may be subjected to a preliminary thermal treatment at about 120°–400° C., directed to remove a part of the crystallization water and correspondingly increase the percentage content of silica. In addition the desirable colloidal silica present in the form of siloxane three-dimensional lattice, there may be provided in the colloidal minerals useful in this invention such further components as $Al_2O_3$—$Fe_2O_3$—$MgO$—$CaO$—$Na_2O$—$K_2O$ and $H_2O$ in the form of crystallization water, in the most disparate of mutual proportions.

The suitable minerals for use as colloidal substances in this invention have structures with the three-dimensional lattice formed by siloxane chains O—Si—O—Si—O—Si ... wherein mono- and polyvalent ions of alkalis with negative lattice "modifier" action are compensated for by ions of positive lattice "forming" elements.

For example, such requirements are met by the aluminum element, on condition that the molecule $Al_2O_3$ substitutes two molecules of $SiO_2$ saturating its third bond with an alkaline ion. The crystalline state of such groups has faces of tetrahedral form of $SiO_4^+$. The structure water contained in the lattice of these minerals is composed of free OH groups or OH's linked to two tetrahedrons of the silica, thereby through the aforesaid thermal treatments the crystallization water may be removed causing a percentage increase of $SiO_2$.

As cited heretofore, the above-mentioned minerals mainly including colloidal silica may be used either mixed together or associated with additional minerals composed of colloidal hydrosilicates of aluminum or silica. Such additional minerals may be admixed to the minerals including colloidal compounds according to the invention in proportions from 0.001% to 50%.

The colloidal substances which may be used as the additive according to the invention, when submerged in the metallurgic liquid, owing to the high temperatures connected with the melting of metals and ferrous and non-ferrous alloys, increase considerably in volume and form within the bath a broad and consistent film, by virtue of the fact that in spite of the high temperatures, e.g. on the order of 1750° C. in liquid steel, there occurs no substantial breaking of the bonds existing in the colloidal substance. Each non-metallic foreign particle, which, being in the molten bath, contacts the broad colloidal film formed by expansion (sometimes up to 20 times their initial volume) of the substances adapted for use as additives in this invention, is directly and firmly absorbed and entrained rapidly to the surface of the bath by the cited additives. Here, on contacting the air overlying the metal bath, the colloidal film with the impurities absorbed coagulates to assume the consistency of a uniform solid slag which, if necessary, may be easily removed. Thus, the solid phase metals and metal alloys will appear as substantially free of non-metallic inclusions and, accordingly, with improved mechanical characteristics.

However, the additive of this invention will also make removal of the slag possible as is formed within the metallurgic baths and which is, in turn, in the form of dispersed colloidal film. This colloidal state slag is in any case absorbed by the colloidal film formed by the additive of this invention in its upward movement, which on reaching the surface of the metallurgic bath with considerable increase of its initial volume will coagulate and thus retain large amounts of slag.

The colloidal substance according to the invention, as a function of its large volume and of its density of 0.20–0.40 max moves back, almost instantaneously after its immersion, to the surface of the metals or liquid alloys. The difference between the surface tension of the metal and alloys and that of the colloidal substances will result in immediate neat separation of the two phases, and on contacting the atmosphere the colloidal substance will tend to rapidly solidify.

Furthermore, the additive comprising the colloidal substances of this invention has the added advantage of favorably affecting the solidification process and consequent solid structure of the formed material. In fact, it is known that the structure to be obtained on solidification depends on the first crystals that form in the liquid, and the more numerous these will be the more will the resulting structure exhibit a finer grain with positive effects on its characteristics. It has been found that at the high temperatures in the metallurgic liquid, there exists a certain lower percentage of the microscopic particles of the colloidal substances which separate from the formed colloidal film to remain isolated and suspended within the metallurgic liquid. Of these separated particles, those having suitable radii will serve as cores for the first solidification crystals, and the more numerous the nuclei the more intensive will be the crystal nucleations, to result in solid metallic structures having a finer grain than those which do not contain the additive of this invention.

In cast irons, the heterogenous nuclei formed by the isolated colloidal particles will function as supports for the formation of the primary austenitic cast iron, which will determine in the solid phase graphite in the form of thin dispersed flakes, and in the instance of spheroidal cast iron, smaller and more numerous spheroids which contribute toward improving the mechanical characteristics of the cast iron.

It has also been found that the additive of this invention acts as an effective thermal insulator and barrier to the external gases where present at the surface of the metal bath causing the bath to retain its temperature over much longer times and thus allowing castings of long duration without involving excessive overheating of the liquid.

Moreover, the perviousness, of the colloidal layer or film to gasses, at the surface of the liquids is so reduced as to prevent the aeriforms overlying the liquid metal surface from entering it. That layer may also be provided artificially in the course of the casting or introduction of readily oxidized metals or alloys into the liquid, thereby castings similar to those performed under a vacuum or inert atmosphere may be carried out without the problems brought about by low pressure, not least that of favoring the reduction of the oxides of the rammings which line the crucibles of the furnaces and ladles.

Furthermore, the additives of this invention have a high chemical inertia which will prevent any chemical reactions from taking place with the metals or alloys treated therewith. The lack of formation of bonds due to the chemical inertia between the metals and alloys in the liquid state and the colloidal siloxane substance creates repulsion phenomena between the two phases resulting in a certain turbulence through the body of metals and molten alloys, also on account of unequal interface tensions appearing therebetween.

Since in the various metallurgies, added into the Si solvent liquid are metals or alloys both as alloying elements and to obtain metal-metalloids reactions, in the former instance diffusion, and in the latter the chemical activity of such added metals or alloys, will be increased by the effect of the turbulence caused by the colloidal siloxane mineral increasing the kinetics of the alloy particles and consequently their diffusion and reactivity, thus performing a catalyst function.

The additives according to this invention may be added in any manner or at any points of the metallurgic process, being mixable with the metallic liquid bath, placeable at the bottom of furnaces or ladles, or blowing in in a finely subdivided form by using blowing nozzles inside the liquid metal baths. That additive will be used in amounts ranging from 0.1% to 0.3% by the weight of the liquid metal bath being treated, e.g. 2 kg/t metal bath.

The examples which follow illustrate different possible embodiments of this invention, it being understood that the invention is not restricted to such specific forms.

EXAMPLE NO. 1

Tests on Steel

The tests were carried out on 32 tons of molten steel from an electric furnace, for continuous casting of billets later to be used in the extrusion of thin wire rod. The chemical characteristics for this killed steel are C 0.06–0.08%; Si 0.80–0.90%; Mn 1.35–1.45%. Colloidal substances were introduced into the casting ladle to the amount of 100 kg and comprising a mixture of 70% perlite and 30% kieselgur.

The following samples have been extracted:

No. 1 from the ladle in completion of scorification by removal of slag and pouring thereof into a specially provided tank by tilting the furnace with the so-called syphon method without adding colloidal substances;

No. 2 from the ladel at the bottom whereof said 100 kg colloidal substances were placed in bags weighing 20 kg each; scorification had been carried out previously with the same method as for No. 1;

No. 3 samples extracted in the course of the extrusion and having a square measuring 4 cm along the side, from the steel of No. 2; assessment of the non-metallic inclusion content was effected by microscope examination in conformity with the UNI 3244 Standard and at a linear magnification of 100x.

Sample No. 1

Diffused inclusional state with the presence of:
inclusions of the group D subgroup S 5 thickness about $8\mu$
inclusions of the group D subgroup G 5 thickness about $12\mu$
inclusions of the group B subgroup S 5 thickness about $9\mu$ Sample No. 2

Inclusional state nearly absent with the presence of:
inclusions of the group D subgroup S 1 thickness about $8\mu$
inclusions of the group B absent Sample No. 3

Inclusional state nearly absent with the presence of:
inclusions of the group C subgroup S 1 thickness about $5\mu$
inclusions of the group D subgroup S 1 thickness about $8\mu$
inclusions of the group B absent Temperature of the continuously cast steel 1626° C. The liquid steel shows to be particularly flowable even at the end of the casting; no slag formation close to the tundish orifice.

On examination, the structure of sample No. 3 shows to have a fine grain without breaks.

EXAMPLE NO. 2

Cast Iron Retained in the Induction Furnace

Currently, in the course of retaining times up to 48 hours, the induction furnace at mains frequency is placed in the standby position which consists of leaving inside the furnace a batch of liquid cast iron equal to one-third of its capacity and keeping that batch heated.

The above procedure has, however, the following disadvantages: the need for occasional intervention by operators to monitor the power supply with an increased consumption of electric energy to heat the batch in order to avoid dangerous undercooling of the liquid, formation of slag requiring the introduction of cast iron pigs to dilute it, oxidation of the cast iron with significant losses of carbon in the 5% to 10% range. This results in the first casting following the standstill giving a reject percentage in the cast pieces which is quite high.

That practice also involves an increased wear of the furnace refractory with the presence of cracks, which are a source of seepage, in the upper region of the furnace not contacting the liquid cast iron of the batch. This is due to the fact that in the standstill state the furnace ramming has two different thermal gradients, and in the instance of the furnace upper region, a cooling effect.

The tests have been carried out with an induction furnace at mains frequency and having a capacity of 1500 kg cast iron.

The placement in standstill has been performed as follows: the furnace was filled to its full capacity of 1500 kg liquid cast iron. The surface has been covered with a layer of colloidal substances formed by opals and using them in the amount of 3 kg over the surface area. Waiting for a few minutes in order for the whole surface to be covered and isolated by expansion of said substances.

Using a probe pyrometer, the temperature of the underlying liquid cast iron has been measured while drawing a sample of the same for carbon determination purposes.

T° measured at 1350° C. total carbon 3.60%.

During the standstill a uniform power has been supplied which is the equal of the 200 kWh electric power consumption.

The standstill lasted for 56 hours without any interventions, during which it was found that the cast iron remained perfectly liquid, thereby it was unnecessary to supply higher power. It has been found, moreover, that the gases contained in the cast iron in moving up to the surface formed bubbles with the colloidal substances perfectly spherical and of considerable size.

These on reaching a variable diameter exploded and released the gases.

Thus, it was found that the liquid naturally rid itself of the endogenous gases, whilst the colloidal layer prevented the reverse phenomenon.

At the end of the 56 hours period, the temperature of the liquid was measured at 1340° C., that is, with a loss of only 10° C., and a sample was drawn for carbon determination purposes with the result of 3.59%, i.e. a negligible loss of 0.01%.

On completion of the scorification, it was found from an examination of the slag that the colloidal substances had incorporated the slag which had come up during the standstill.

The liquid cast iron was immediately poured into molds and the solidified pieces showed to be all perfectly sound.

EXAMPLE NO. 3

Addition of Cast Iron Components Under a Colloidal Protective Blanket

A mains frequency induction furnace with a three tons capacity has been fully loaded with high-test cast iron, chemical composition 1.30% C 0.80% Si, as brought to a liquid state, and this was covered with colloidal substances in conformity with the method of Example No. 2, using the same substances and amounts.

Under the colloidal blanket, there were introduced carbon in graphite form and silicon in iron-silicon form 75%. A hypereutectic cast iron was obtained with total carbon 3.90 and silicon 2.50%. The yield, between the introduced and obtained amounts, was total. Since the addition occurred at the temperature as measured by a probe pyrometer of 1500° C., and at this temperature the oxidability of both carbon and silicon is considerable, which shows that the colloidal blanket had operated under vacuum on the underlying liquid cast iron.

The results achieved allow, therefore, operation with the same results also in other different metallurgies, such as, by way of non-limitative example, of steel, aluminum, copper, zinc, titanium, etc.

EXAMPLE NO. 4

Scorification at the Bottom and Core of Liquid Cast Iron

As is known, and as mentioned hereinabove, common to all of the various cast iron melts is slag having a low-melting point, and slag having a high-melting point, which remains in the dispersed state, as well as the formation of colloidal films which do not move to the surface of the liquid bath. However, in the instance of the manufacture of ferritic, perlitic, or Ni resist spheroidal cast iron, the latter is obtained through the massive introduction of high magnesium content alloys. That element has the power of reducing the rammings of the ladles wherein said treatment takes place, irrespective of whether these are acidic, or basic, or aluminous, thus increasing the amount of slag to the point that the rejected castings on account of slag inclusion faults varies statistically between 5% and 15% of the output in that manufacturing process.

Furthermore, and independently of the production of the cast iron type where melting takes place with the use of mains frequency induction furnaces, the currents generated by the electromagnetic induction of a double set of coils create fluid-dynamically opposed streams, thereby between sets of coils there is created a neutral zone wherein even the slag having a high-melting point is strongly retained.

Consequently to the above, in induction furnaces of this type, the interior of the liquid bath is more contaminated than, for example, the cast iron obtained from cupola furnaces.

With this premise, the tests were carried out on a mains frequency induction furnace with a capacity for three tons cast iron, in a casting ladle and in a treatment ladle for the manufacture of spheroidal cast irons. The colloidal substances used comprised vermiculite 30% and Silica Gel 70%.

(1) Induction furnace

Onto the bottom of the furnace, 2.5 kg per ton of colloidal substances were introduced with the furnace stopped. All of the slag was brought to the surface by the colloidal blanket and readily skimmed from the furnace surface.

Casting of the liquid into the ladle required no further scorification treatments. The liquid cast iron showed to be particularly fluid. All of the castings on micrographic analysis showed to be slag-free.

(2) Treatment ladles for spheroidal cast irons

Several industrial tests were carried out on ferritic, perlitic, and Ni resist spheroidal cast irons.

The high magnesium content alloys comprised silicon magnesium alloys Mg 5-10% and nickle magnesium alloys Mg 15% placed at the bottom of the treatment ladle and covered by powders of colloidal substances introduced in the amount of 3 kg per ton cast iron.

The colloidal blanket which formed at once with the casting of the liquid cast iron into the ladle much decreased the effects of the oxidation reaction of magnesium picking up the fumes.

All the castings were later found to be free of either micro- or macro-inclusions of slag.

The graphite nodules appeared to be smaller and more numerous with respect to the usual production, which further confirms the positive influences of the colloidal particles as graphite supporting seeds as formed in the austenite, since the graphite nodules are also originated in that state from the primary graphite.

EXAMPLE NO. 5

Silicon Aluminum and Bronze Alloy Treatment

The colloidal substances comprising kieselgur were placed respectively at the bottom of the casting ladle in the proportion of 2 kg per ton. The colloidal blanket was readily skimmed and the castings examined at the electron microscope SEM gave the following results:

Aluminum silicon alloys—no alumina or aluminum hydroxide formations were observed, absence of endogenous colloidal films.

Bronzes—no presence of low-melting inclusions detected as normally determined by complex compounds of sulphides and phosphides, with absence of endogenous colloidal films.

I claim:

1. An additive for metallurgic liquids effective to improve the characteristics of the metal or metal alloy articles produced, characterized in that it comprises at least one colloidal substance comprising from 20% to 99.9% by weight colloidal silica, in the siloxane three-dimensional lattice form, comprising from 1% to 99.9% dispersed particles by the weight of said colloidal silica.

2. An additive according to claim 1, characterized in that said colloidal substance comprises 34% to 80% by weight colloidal $SiO_2$ with a content of dispersed particles ranging from 30% to 90%.

3. An additive according to claim 1, characterized in that said colloidal substance comprises, additionally to said colloidal silica, one or more substances selected from $Al_2O_3$, $Fe_2O_3$, MgO, CaO, $Na_2O$, and $K_2O$, together with crystallization water.

4. An additive according to claim 1, characterized in that said colloidal substance is selected from one or more of the following minerals: opal, kieselgur, obsidians, pumices, zeolites, vermiculites, and bentonites.

5. An additive according to claim 4, wherein said mineral is used in mixtures with 10% to 50% by weight referred to the mixture of an additional mineral consisting of a colloidal hydrosilicate of alumina or silica.

6. An additive according to claim 5, wherein said colloidal hydrosilicate of alumina or silica is selected from hydrargillite, diaspore, allogonite and lincolnite.

7. An additive according to claim 4, wherein said mineral is subjected to a preliminary thermal treatment at a temperature in the 120° to 400° C. range to remove at least some of the crystallization water and increase the percent content of silica thereof within said 20% to 99.9% range by weight.

8. A metallurgic liquid for the manufacture of metal or metal alloy articles, characterized in that it comprises 0.1% to 0.3% by weight with respect to the weight of said liquid of an additive according to claim 1.

9. A metallurgic process for the manufacture of metal or metal alloy articles of improved characteristics, comprising the steps of providing a metallurgic ferrous or non-ferrous liquid bath, adding to it from 0.1 to 0.3% by weight of the weight of said liquid bath of an additive which comprises at least one colloidal substance comprising from 20% to 99.9% by weight colloidal silica in the siloxane three-dimensional lattice form and capable thereby to expand its volume upon contact with said metallurgic bath, said colloidal silica comprising from 1% to 99.9% dispersed particles by the weight of said colloidal silica, leaving said additive to expand so as to form a film on the surface of said liquid bath containing as inclusions slag and degassing reaction products, removing said slag containing surface film and solidifying by cooling said liquid bath.

10. A process according to claim 9 wherein said additive comprises said colloidal substance containing 34% to 80% by weight colloidal $SiO_2$ with a content of dispersed particles ranging from 30% to 90%.

11. A process according to claim 1, wherein said colloidal substance comprises, additionally to said colloidal silica, at least one substance selected from the group consisting of $Al_2O_3$, $Fe_2O_3$, MgO, CaO, $Na_2O$, $K_2O$ and mixture thereof together with crystallization water.

12. A process according to claim 1, wherein said colloidal substance is selected from the group consisting of the following minerals: opal, kieselgur, obsidians, pumices, zeolites, vermiculites, bentonites and mixture thereof.

13. A process according to claim 12, wherein said mineral is used in mixtures with 10% to 50% by weight referred to the mixture of an additional mineral consisting of a colloidal hydrosilicate of alumina or silica.

14. A process according to claim 13, wherein said colloidal hydrosilicate of alumina or silica is selected from hydrargillite, diaspore, allogonite and lincolnite.

15. A process according to claim 12, further comprising subjecting said mineral to a preliminary thermal treatment at a temperature in the 120° to 400° C. range to remove at least some of the crystallization water and increase the percent content of silica thereof within said 20% to 99.9% range by weight.

* * * * *